United States Patent [19]
Burrell

[11] Patent Number: 5,207,240
[45] Date of Patent: May 4, 1993

[54] SELF ALIGNING NOZZLE FOR A FLAPPER VALVE

[75] Inventor: Jonathan C. Burrell, Olathe, Kans.

[73] Assignee: Allied Signal Inc., Morristown, N.J.

[21] Appl. No.: 946,265

[22] Filed: Sep. 16, 1992

[51] Int. Cl.⁵ .......................................... G05D 16/18
[52] U.S. Cl. ............................................... 137/82
[58] Field of Search .................. 137/82, 84, 85; 251/86

[56] References Cited

U.S. PATENT DOCUMENTS

| | | | |
|---|---|---|---|
| 2,450,535 | 10/1948 | Watson | 60/39.281 X |
| 3,174,498 | 3/1965 | Joesting | 137/82 |
| 3,297,044 | 1/1967 | Thorburn | 137/82 |
| 3,757,639 | 9/1973 | Baum | 137/82 X |
| 4,837,697 | 6/1989 | Eisa | 60/39.281 X |
| 4,928,729 | 5/1990 | Hornby | 251/86 X |

*Primary Examiner*—Alan Cohan
*Attorney, Agent, or Firm*—Leo H. McCormick, Jr.; Larry J. Palguta; Robert A. Walsh

[57] ABSTRACT

A self aligning nozzle for a flapper valve through which fluid at a controlled pressure is supplied to a servo system. The nozzle which is retained in a semi-spherical member and is adapted to be rotated about its axial center to maintain a face of an orifice in a perpendicular relationship with a face on a lever that moves about a pivot in response to an operational pressure differential in the servo system in a shut off position to prevent leakage into the servo system.

7 Claims, 1 Drawing Sheet

SELF ALIGNING NOZZLE FOR A FLAPPER VALVE

This invention relates to a self aligning nozzle for a flapper valve to maintain an orifice through which fluid is supplied to a system in a perpendicular relationship with a face on a lever that rotates about a pivot in response to an operational pressure differential.

In order to maintain regulated pressure for a fluid in a control system, it is common practice to utilize pressure differential sensitive bellows to move a lever associated with a flapper valve and allow fluid to flow through an orifice of a nozzle at varying rates. The nozzle is normally fixed in an opening and the lever moves about a pivot. The null position between the lever and nozzle in this flapper valve varies as a function of the angle of rotation of the lever about the pivot and as a result proper alignment must be achieved to achieve a shut off without leakage. U.S. Pat. No. 2,450,535 discloses structure wherein a halfball is attached to a lever in an attempt to maintain alignment between an orifice and face on the lever when rotated about the pivot to a closure position. This type structure adequately performs for use in many control systems, unfortunately, considerable mass is added to the lever which must be balanced in order to prevent instability under certain accelerated or sustained flow conditions.

In the present invention, a nozzle retained in a stationary stem member has been developed for obtaining a desired alignment between an orifice and a face on a lever of a flapper valve. The stem is located in a passage of a housing connected to a source of operational fluid. The stem has a cylindrical body with a blind bore therein connected to the source of fluid through a plurality of radial openings. The cylindrical member has an annular inwardly projecting rib or crimp for retaining a semi-spherical member in the blind axial bore. The semi-spherical member has an axial bore extending perpendicular therethrough from a base and a plurality of radial slots extending in a plane perpendicular to the axial bore. A spring located in the blind axial bore urges the semi-spherical member into engagement with the rib. Fluid from the source flows through the blind axial bore and axial bore in the semi-spherical member toward the face on the lever. The retention of the semi-spherical member by the rib allows the semi-spherical member to rotate such that the radial slots are maintained in a plane parallel with the lever as the lever pivots. When the lever moves to a shut off position, the nozzle and lever are aligned through rotation of the nozzle to assure that the lever is completely seated on the orifice and no fluid communication occurs through the flapper valve.

It is an object of this invention to provide a flapper valve with a self aligning nozzle which correspondingly rotates as a function of the pivotal rotation of a lever by a bellows to maintain the perpendicular relationship with the lever to effectively prevent the flow of an operational fluid through an orifice in a shut off position.

It is another object of this invention to provide an adjustable stem for a flapper valve which includes a rotatable nozzle to maintain an orifice and face on a lever in a perpendicular space relationship.

It is a further object of this invention to provide a flapper valve with an adjustable and rotatable nozzle to maintain the controlled flow of fluid to a system to define a regulated pressure for an operational system.

These objects and others should be apparent from reading this specification while viewing the drawings wherein.

Figure 1:
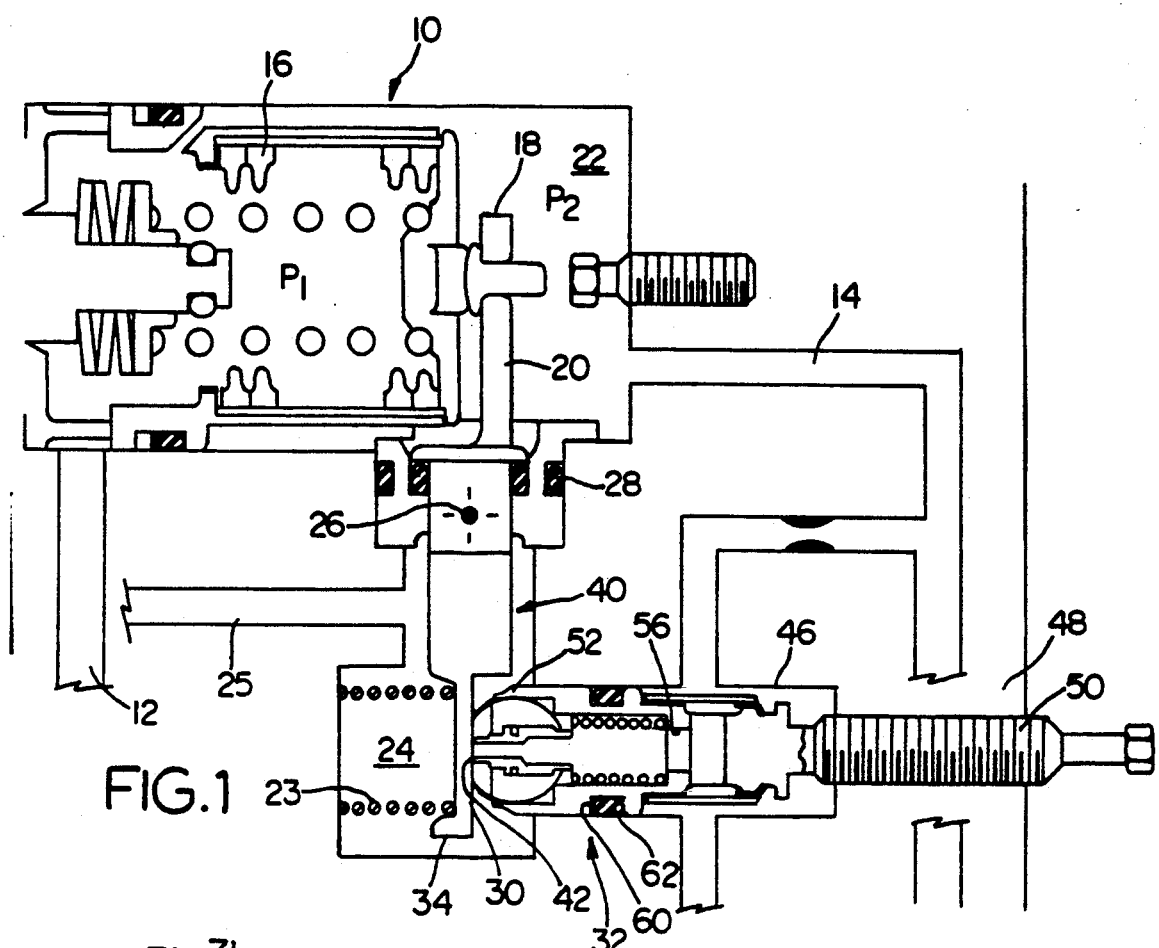
FIG. 1 is schematic illustration of a system having a flapper valve as defined by this invention incorporated therein.

In the control system shown in FIG. 1, a head sensor 10 receives an first input through conduit 12 corresponding to a fluid pressure P1 of a supply fluid and a second input through conduit 14 corresponding to a pressure P2 of fuel supplied to a fuel manifold of an engine. The pressure differential P1-P2 across the head sensor corresponds to the position of a metering valve plate in a fuel control to establish a desired operational speed in the engine. The head sensor 10 is of the type disclosed in U.S. Pat. No. 4,837,697 which includes a bellows 16 which is connected to a first end 18 of lever 20 of a flapper valve 40. Lever 20 which extends from chamber 22 in the head sensor 10 into chamber 24 in the flapper valve 40 is retained by pin 26. A seal 28 which surrounds lever 20 prevents communication between chambers 22 and 24. Lever 20 has a face 30 located on a second end 34 which moves in an arc about pin 26 to change the space relationship with a face 42 of nozzle 32 and create a variable area orifice through which an operational fluid is communicated through a flapper valve 40. The arcuate movement of the lever 20 is a direct function of the action of the pressure differential P1-P2 as experienced by bellows 16. The flow of operational fluid through nozzle member 32 is communicated to a pressure regulator valve associated with the metering valve to maintain the P1-P2 differential at a desired level. As lever 20 moves in the arc about pin 26, semi-spherical member 72 of nozzle 32 is maintained in a fixed position and when the lever 20 moves face 30 into engagement with face 42 a perpendicular relationship with face 30 on the lever 20 is assured to completely interrupt the flow of operational fluid flow therethrough during shutoff of the engine. The ability of nozzle 32 to be rotated to provide for a perpendicular relationship during shut off while allowing smooth flow of operational fluid through the flapper valve 40 is provides a accurate control input for the system.

Figure 2:
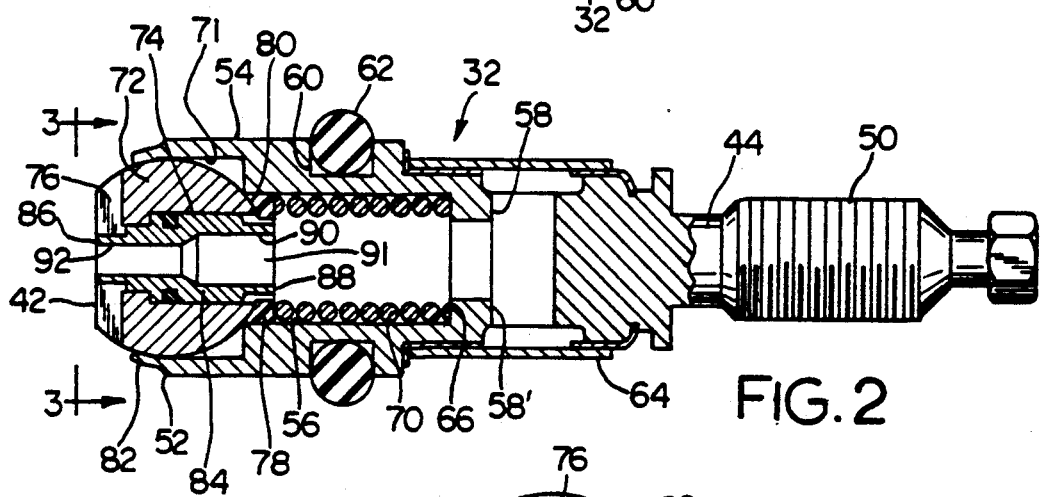
FIG. 2 is a sectional view of the stem for the flapper valve of FIG. 1.
Figure 3:
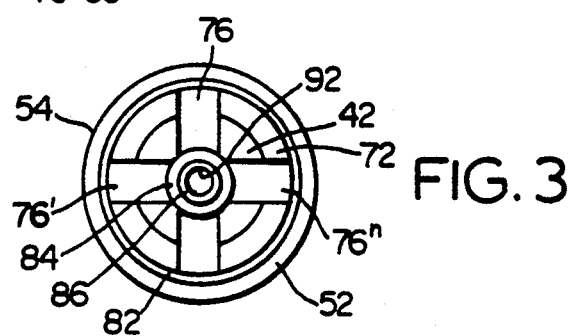
FIG. 3 is a view taken along lines 3—3 of FIG. 2 showing the radial slots on the base of the semi-spherical member retained in the blind bore of the stem.

In more particular detail, as shown in FIGS. 2 and 3, nozzle member 32 includes a stem 44 with a cylindrical body 54 having a first end 50 with threads thereon which engage housing 48 to locate a second end 52 in a passageway 46 connected to conduit 14. Cylindrical body 54 has a blind axial bore 56 extending from the second end 52 and cross bore or radial holes 58,58' for connecting the blind axial bore 56 with source of fluid presented to passage 46 from conduit 14. A filter 64 located over the cross bore or radial holes 58,58' prevents any contamination in the fluid presented to passage 46 from entering into the blind bore 56 and a seal 62 located in groove 60 engages housing 48 to prevent fluid communication from passage 46 to chamber 24 along the peripheral surface of the cylindrical body 54. Cylindrical body 54 has a first shoulder 66 located adjacent the radial holes or cross bore 58,58' for retaining a spring 70 and a second shoulder 68 located adjacent the second end 52. The diameter 71 of the blind bore 56 adjacent the second end 52 of the cylindrical body 54 is substantially equal to the diameter of a semi-spherical member 72 retained in the blind axial bore 56 by crimping the second end 52 to form a flange or rib 82 which engages the semi-spherical member 72.

The semi-spherical member 72 has an axial bore 74 which extends perpendicular therethrough from the base of face 42. The semi-spherical member 72 has a plurality of radial slots 76, 76'. . . $76^n$ which extends in a plane perpendicular to axial bore 74 along face 42. Spring 70 acts on an annular ring 78 to urge a semi-spherical face 80 thereon into engagement with the semi-spherical member 72 and correspondingly the semi-spherical member 72 into engagement with flange or rib 82.

The nozzle member 32 further includes a sleeve 84 located in axial bore 74 which has a first end 86 and a second end 88. The interior surface of sleeve 84 has an axial bore 91 formed by a first diameter 90 that transitions into a second diameter 92. The first diameter 90 forms an orifice through which fluid flows from passage 46 into chamber 24. Semi-spherical member 72 can rotate within diameter 71 to maintain end 86 of sleeve 84 which is flush with the base or face 42 of the semi-spherical member 72 in a plane parallel to face 30 on lever 20 at all times.

stem 44 is initially threaded in housing 48 and a pressure differential is created across bellows 16 to position lever 20 such that face 30 is seated on end 86 of sleeve 84 and no flow occurs between passage 46 and chamber 24. Spring 23 acts on lever 20 hold face 30 on end 86 and maintain this seat arrangement until a pressure differential across bellows 16 is sufficient to rotate lever 20 about pin 26 and creates a variable orifice which allows communication of fluid from conduit 14 to occur through flapper valve 40 by way of blind bore 56 and axial bore 91 formed in the interior of sleeve 84. As fluid flows from end 86 it is deflected by face 30 into radial slots 76, 76'. . . $76^n$ and causes the semi-spherical member 72 to rotate on ring 78 such that substantially no turbulence occurs in the fluid flowing into chamber 24. The flow of fluid from passage 46 and subsequently from chamber 24 through conduit 25 is designed to modify the operational pressure of fluid as presented to chamber 22 through conduit 14 in accordance with a desired operational specification.

When the pressure differential across head sensor 10 is such that a shut down of the engine is detected, bellows 16 acts on lever 20 such that face 30 on end 34 is seated on end 86 of sleeve 84 to terminate flow communication between passage 46 and chamber 24. Semi-spherical member 72 is designed to rotate within ring 78 as a function of the arcuate rotation of lever 20 about pin 26 and end 86 is retained in a perpendicular relationship with face 30 to prevent leakage through the flapper valve 40 in the shut off position.

I claim:

1. In a servo system having a flapper valve with a lever which rotates about a pivot from a shut off position as a function of movement of a bellow member responding to a pressure differential between a first pressure and a second pressure to define a space relationship with a nozzle to control the flow of fluid from a source, the improvement in the nozzle comprising:

a stem member located in a passageway of a housing, said stem having a cylindrical body with a first end and a second end, said cylindrical body having a blind axial bore extending from said second end and radial holes for connecting said blind axial bore with said source of fluid, said cylindrical body having an annular inwardly projecting rib located adjacent said second end;

a semi-spherical member retained in said blind axial bore of said stem member by said rib, said semi-spherical member having an axial bore extending perpendicular therethrough from a base, said semi-spherical member having a plurality of radial slots extending in a plane perpendicular to said axial bore along said base; and resilient means located in said blind axial bore for urging said semi-spherical member into engagement with said rib, said fluid from said source flowing through said blind axial bore and axial bore toward said lever, said bellows moving said lever into engagement with said base of said semi-spherical to terminate flow of fluid through said blind axial bore, said rib allowing said semi-spherical member to rotate such that the radial slots are maintained in a plane parallel with the lever to assure that said lever is seated on said base and the no fluid leakage occurs through said blind axial bore in a shut off position.

2. In the servo system as recited in claim 1 further including:

an annular member located between said resilient means and said semi-spherical member, said annular member having a seat thereon which allows said semi-spherical to be rotated along its axis to obtain a perpendiculiar relationship between said nozzle and lever in the shut off position.

3. In the servo system as recited in claim 2 further including:

a sleeve located in said axial bore and having a first end and a second end, said sleeve having an interior surface with a first diameter surface that transitions into a second diameter surface, said second diameter forming an orifice through which fluid is communicated toward said lever.

4. In the servo system as recited in claim 3 wherein said stem is positioned within said passageway to initially set a desired space relationship with said lever.

5. In the servo system as recited in claim 4 wherein said radial slots direct fluid away from said lever in a uniform manner to attenuate the creation of turbulence.

6. In the servo system as recited in claim 5 further including:

filter means surrounding said stem for preventing contaminates from entering into said blind axial bore through said radial hole to assure that said second diameter of said sleeve is not restricted.

7. In the servo system as recited in claim 6 further including:

a spring for urging said lever toward said second end of said sleeve to aid in preventing flow of fluid through said orifice from abruptly moving said lever.

* * * * *